United States Patent
Somaskanthan et al.

(10) Patent No.: US 11,902,140 B2
(45) Date of Patent: Feb. 13, 2024

(54) SYSTEMS AND METHODS FOR ACTIVATING FEC PROCESSING PER APPLICATION PROBE CLASS

(71) Applicant: Cisco Technology, Inc., San Jose, CA (US)

(72) Inventors: Vishali Somaskanthan, Milpitas, CA (US); Saurabh Kumar, Newark, CA (US); Satyajit Das, Lake Tapps, WA (US); Priyanka Chidambar Patil, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 8 days.

(21) Appl. No.: 17/815,099

(22) Filed: Jul. 26, 2022

(65) Prior Publication Data

US 2023/0344741 A1   Oct. 26, 2023

Related U.S. Application Data

(60) Provisional application No. 63/332,774, filed on Apr. 20, 2022.

(51) Int. Cl.
*H04L 43/12* (2022.01)
*H04L 1/00* (2006.01)

(52) U.S. Cl.
CPC ............ *H04L 43/12* (2013.01); *H04L 1/0021* (2013.01); *H04L 1/0045* (2013.01)

(58) Field of Classification Search
CPC ....................................................... H04L 43/12
See application file for complete search history.

(56) References Cited

U.S. PATENT DOCUMENTS

| 2004/0015765 A1 | 1/2004 | Cooper et al. |
| 2008/0040648 A1 | 2/2008 | Li et al. |
| 2011/0225476 A1 | 9/2011 | Thottan et al. |

(Continued)

FOREIGN PATENT DOCUMENTS

CN   108965775 A   * 12/2018   ............... H04N 7/15

OTHER PUBLICATIONS

S. Mehrotra, J. Li, and Y.-Z. Huang, "Optimizing FEC transmission strategy for minimizing delay in lossless sequential streaming," IEEE Trans. Multimedia, vol. 13, No. 5, pp. 1066-1076, Oct. 2011. (Year: 2011).*

*Primary Examiner* — Joseph D Torres
(74) *Attorney, Agent, or Firm* — Baker Botts L.L.P.

(57) ABSTRACT

In one embodiment, a method includes configuring a first application probe class and a second application probe class. The first application probe class may be associated with a first Differentiated Services Code Point (DSCP), and the second application probe class may be associated with a second DSCP. The method also includes determining an adaptive Forward Error Correction (FEC) data policy for the first application probe class and the second application probe class, calculating a first loss value associated with the first application probe class for a link between a first network node and a second network node, and comparing the first loss value to a first loss threshold. The method further includes determining whether to activate FEC processing for the first application probe class in response to comparing the first loss value to the first loss threshold.

20 Claims, 4 Drawing Sheets

(56) References Cited

U.S. PATENT DOCUMENTS

| | | | |
|---|---|---|---|
| 2012/0011413 A1* | 1/2012 | Liu | H03M 13/25 |
| | | | 714/746 |
| 2013/0287023 A1 | 10/2013 | Bims | |
| 2017/0126256 A1* | 5/2017 | Salomons | H04L 65/762 |
| 2021/0218670 A1* | 7/2021 | Pande | H04L 45/3065 |

* cited by examiner

SYSTEMS AND METHODS FOR ACTIVATING FEC PROCESSING PER APPLICATION PROBE CLASS

CROSS-REFERENCE TO RELATED APPLICATIONS

This application claims benefit of U.S. Provisional Patent Application No. 63/332,774 filed Apr. 20, 2022 by Vishali Somaskanthan et al., and entitled "TRAFFIC ENGINEERING SENSITIVE ADAPTIVE FEC," which is incorporated herein by reference as if reproduced in its entirety.

TECHNICAL FIELD

The present disclosure relates generally to communication networks, and more specifically to systems and methods for activating Forward Error Correction (FEC) processing per application probe class.

BACKGROUND

FEC is a technique used to recover lost packets on a network link. FEC may send extra "parity" packets for every group (N) of packets. As long as the receiving network node receives a subset of packets in the group (e.g., N−1) and the parity packet, a lost packet in the group can be recovered. While FEC aims to improve end-to-end network performance by avoiding retransmissions from the sending network node, FEC parity packets increase the overhead of the bandwidth consumption on the network link.

DESCRIPTION OF EXAMPLE EMBODIMENTS

Overview

According to an embodiment, a first network node includes one or more processors and one or more computer-readable non-transitory storage media coupled to the one or more processors and including instructions that, when executed by the one or more processors, cause the first network node to perform operations. The operations include configuring a first application probe class and a second application probe class. The first application probe class may be associated with a first Differentiated Services Code Point (DSCP), and the second application probe class may be associated with a second DSCP. The operations also include determining an adaptive Forward Error Correction (FEC) data policy for the first application probe class and the second application probe class, calculating a first loss value associated with the first application probe class for a link between a first network node and the second network node, and comparing the first loss value to a first loss threshold. The operations further include determining whether to activate FEC processing for the first application probe class in response to comparing the first loss value to the first loss threshold.

In certain embodiments, the FEC policy associates the first application probe class with the first loss threshold and the second application probe class with a second loss threshold.

In some embodiments, the operations include determining that the first loss value associated with the first application probe class is greater than or equal to the first loss threshold, and/or activating the FEC processing for the first application probe class in response to determining that the first loss value associated with the first application probe class is greater than or equal to the first loss threshold.

In certain embodiments, the operations include determining that the first loss value associated with the first application probe class is less than the first loss threshold, and/or skipping the FEC processing in response to determining that the first loss value associated with the first application probe class is less than the first loss threshold.

In some embodiments, the operations include calculating a second loss value associated with the first application probe class for the link between the first network node and a second network node while the FEC processing is activated, comparing the second loss value to the first loss threshold, determining that the second loss value is less than the first loss threshold, and/or deactivating the FEC processing in response to determining that the second loss value is less than the first loss threshold.

In certain embodiments, the operations include calculating a second loss value associated with the first application probe class for the link between the first network node and a second network node while the FEC processing is activated, comparing the second loss value to the first loss threshold, determining that the second loss value is greater than or equal to the first loss threshold, and/or continuing the FEC processing in response to determining that the second loss value is greater than or equal to the first loss threshold.

In some embodiments, the first application probe class is associated with a first forwarding class and a first color. In certain embodiments, the second application probe class is associated with a second forwarding class and a second color.

According to another embodiment, a method includes configuring a first application probe class and a second application probe class. The first application probe class may be associated with a first DSCP, and the second application probe class may be associated with a second DSCP. The method also includes determining an adaptive FEC data policy for the first application probe class and the second application probe class, calculating a first loss value associated with the first application probe class for a link between a first network node and a second network node, and comparing the first loss value to a first loss threshold. The method further includes determining whether to activate FEC processing for the first application probe class in response to comparing the first loss value to the first loss threshold.

According to yet another embodiment, one or more computer-readable non-transitory storage media embody instructions that, when executed by a processor, cause the processor to perform operations. The operations include configuring a first application probe class and a second application probe class. The first application probe class may be associated with a first DSCP, and the second application probe class may be associated with a second DSCP. The operations also include determining an adaptive FEC data policy for the first application probe class and the second application probe class, calculating a first loss value associated with the first application probe class for a link between a first network node and a second network node, and comparing the first loss value to a first loss threshold. The operations further include determining whether to activate FEC processing for the first application probe class in response to comparing the first loss value to the first loss threshold.

Technical advantages of certain embodiments of this disclosure may include one or more of the following. In certain embodiments, adaptive FEC monitors the network performance metrics (e.g., link loss) at regular intervals and sends redundant data only when necessary (e.g., when the measured metrics indicate that the link is not reliable and vulnerable to errors). Certain embodiments of this disclosure improve the correctness of the loss for different flows. In some embodiments disclosed herein, adaptive FEC is enhanced by calculating loss efficiently for different flows. Adaptive FEC may be activated accurately by calculating actual loss per DSCP class instead of treating the entire traffic in aggregation. The ratio of number of lost packets in each class may vary even when the packets are on the same link.

Certain embodiments of this disclosure optimize the performance of a network (e.g., an Internet Protocol (IP) network) by improving the accuracy of path loss computation, which enhances the reliability of the Transmission Control Protocol (TCP) traffic in a software-defined wide area network (SD-WAN) network. Some embodiments of this disclosure introduce granularity to the loss calculation, which may achieve a higher accuracy and become more meaningful to the optimization of the traffic. By making FEC aware of performance routing (PFR) mean loss calculated per DSCP, the stability of the activation and the deactivation process is not random. Activating FEC on a flow that suffers minimal loss on the same link is avoided. This way, the bandwidth consumption is minimized by the FEC parity packets while still achieving exact guaranteed delivery. In certain embodiments, the gap between the trade-off components of effective error correction versus the overhead of bandwidth consumption by FEC is bridged.

An FEC mechanism at the packet level may improve the end-to-end performance of the network by avoiding retransmissions from the source endpoint. Retransmissions may be avoided by transmitting redundant data over the network periodically, which may be used to derive the lost data at the receiving end. As such, the network reliability for TCP flows may be improved.

Certain embodiments of this disclosure use application-aware routing (AAR) to optimize the path taken by application traffic through the network by directing the traffic to WAN links that support required levels of packet loss, latency, and jitter defined in an application's service-level agreement (SLA). AAR may minimize performance degradation in the event of a network brownout or a soft failure. The tracking of network and path conditions by AAR in real time may quickly reveal performance issues and automatically activate strategies that redirect business critical data traffic to the best available paths that meet the SLA. As the network recovers from the brownout or soft failure conditions, AAR automatically readjusts the data traffic paths, which may reduce network costs due to the data traffic being more efficiently load-balanced.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for activating FEC processing per application probe class. In an SD-WAN, FEC may be used at the packet level to improve the quality of experience across WAN with lossy links. Edge devices may reconstruct lost packets with the FEC feature enabled, thereby reducing the delays. Two modes of enabling FEC include the following: (1) always-on; and (2) adaptive.

With always-on FEC, FEC information is sent with every transmission. With adaptive FEC, FEC information is sent when the loss detected by the system exceeds a packet loss threshold. For example, the FEC reconstruction mechanism may only be activated when the calculated loss of the link (using, e.g., SD-WAN Bidirectional Forwarding Detection (BFD) probe packets) is above a predefined threshold configured via a data policy for different flows. In enterprises, the bandwidth division across different types of traffic using SLAs is widely practiced. These SLAs are flow sensitive. For example, transactional data such as point of sale may need a channel with a low loss. In certain embodiments, these flows are prioritized across the network link by DSCP manipulations. Current FEC implementations do not take these factors into consideration and hence may enable/disable FEC at sub-optimal moments.

Figure 1:
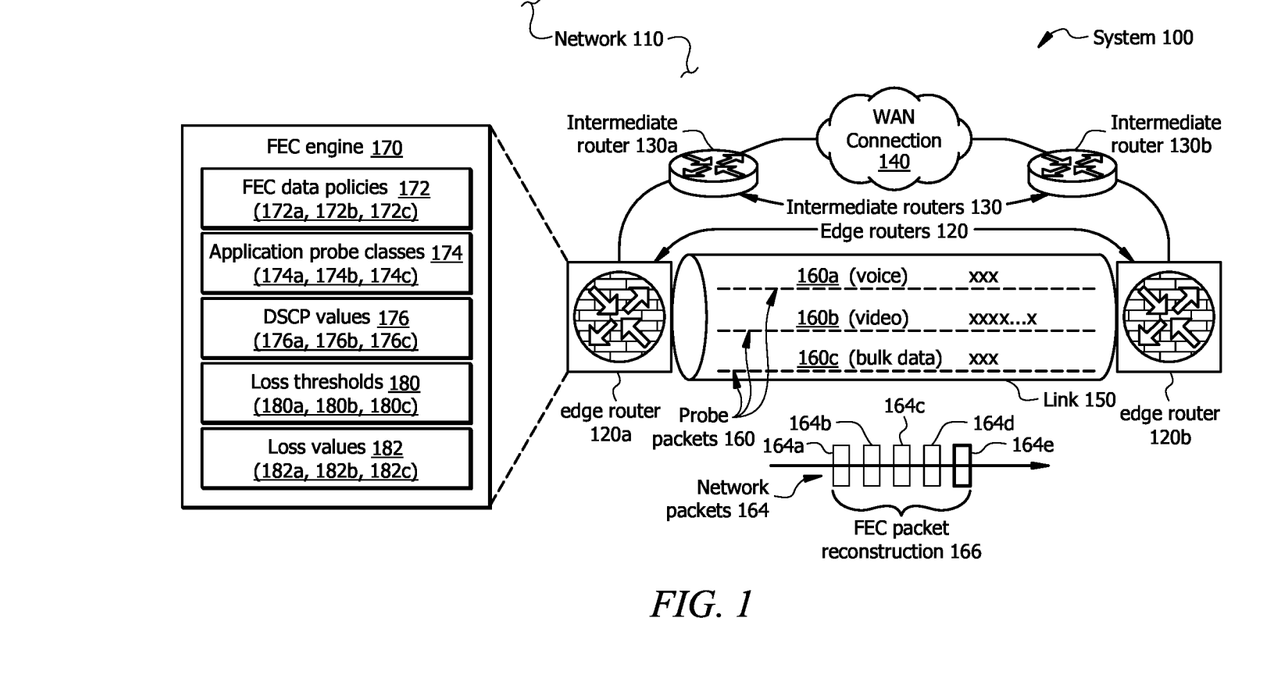
FIG. 1 illustrates a system for prioritizing traffic across a wide area network (WAN), in accordance with certain embodiments.

FIG. 1 illustrates an example system 100 for prioritizing traffic across a network 110. System 100 or portions thereof may be associated with an entity, which may include any entity, such as a business, company, or enterprise, that prioritizes network traffic. In certain embodiments, the entity may be a service provider that provides services for prioritizing network traffic. The components of system 100 may include any suitable combination of hardware, firmware, and software. For example, the components of system 100 may use one or more elements of the computer system of FIG. 5.

In the illustrated embodiment of FIG. 1, system 100 includes network 110, edge routers 120 (edge router 120a and edge router 120b), intermediate routers 130 (intermediate router 130a and intermediate router 130b), a WAN connection 140, a link 150, probe packets 160 (probe packets 160a, probe packets 160b, and probe packets 160c), network packets 164 (network packet 164a, network packet 164b, network packet 164c, network packet 164d, and parity packet 164e), an FEC packet reconstruction 166, an FEC engine 170, FEC data policies 172 (FEC data policies 172a, FEC data policy, 172b, and FEC data policy 172c), application probe classes 174 (application probe class 174a, application probe class 174b, and application probe class 174c), DSCP values 176 (DSCP value 176a, DSCP value 176b, and DSCP value 176c), loss thresholds 180 (loss threshold 180a, loss threshold 180b, and loss threshold 180c), and loss values 182 (loss value 182a, loss value 182b, and loss value 182c).

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a VLAN, a WAN, a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110. In the illustrated embodiment of FIG. 1, network 110 is an SD-WAN.

Network 110 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, hardware devices, bare metal servers, data communications equipment such as computers, routers, servers, printers, workstations, switches, bridges, modems, hubs, and the like. In certain embodiments, nodes use static and/or dynamic routing to send data to and/or receive data to other nodes of system 100. In the illustrated embodiment of FIG. 1, nodes include edge routers 120 and intermediate routers 130.

Edge routers (edge router 120a and edge router 120b) of system 100 are connection points within network 110 that receive, create, store, and/or communicate data along a path. Edge routers 120 provide one or more interfaces for communicating with other nodes of network 110. Edge routers 120 may include one or more hardware devices, software that runs as a virtual machine, and the like. In some embodiments, edge routers 120 handle the transmission of data and/or control traffic. In certain embodiments, edge routers 120 use protocols such as IPv4, IPv6, MPLS, Open Shortest Path First (OSPF), Intermediate System-to-Intermediate System (IS-IS), Border Gateway Protocol (BGP), Packet over SONET/SDH (PoS), Asynchronous Transfer Mode (ATM), Frame Relay, and the like to route packets between WAN locations. In some embodiments, edge routers 120 continuously probe the WAN transports to perform path liveliness, to measure the path characteristics (e.g., loss, latency, jitter, etc.), and the like. In some embodiments, edge routers 120 connect and/or secure enterprise traffic to the cloud.

In certain embodiments, edge routers 120 include security controls. Security controls may include traffic decryption, packet inspection, application identification, access control, malware and/or malicious-URL filtration, intrusion detection and prevention, etc. Edge routers 120 may include hardware-anchored security capabilities for encryption-key storage, device-authenticity checks, etc. In some embodiments, edge routers 120 support network data management, telemetry management, and the like with collection of data on bytes received and/or transmitted based on parameters such as file type, user, network type, link type, application, etc.

Intermediate routers 130 (intermediate router 130a and intermediate router 130b) of system 100 are connection points within network 110 that receive, create, store, and/or communicate data along a path. Intermediate routers 130 provide one or more interfaces for communicating with other nodes of network 110. Intermediate routers 130 may include one or more hardware devices, software that runs as a virtual machine, and the like. In some embodiments, intermediate routers 130 handle the transmission of data and/or control traffic. In certain embodiments, intermediate routers 130 use WAN protocols such as IPv4, IPv6, MPLS, OSPF, IS-IS, BGP, PoS, ATM, Frame Relay, and the like to route packets between WAN locations.

Edge routers 120 and/or intermediate routers 130 may receive information from one or more controllers within network 110. Controllers monitor, operate, manage, troubleshoot, and/or maintain services related to network 110. Controllers may manage provisioning, maintenance, and/or security for network 110. In certain embodiments, one or more edge routers 120 and/or intermediate routers 130 include one or more controllers.

In certain embodiments, edge routers 120 and/or intermediate routers 130 establish and/or maintain WAN connection 140 within network 110. WAN connection 140 of system 100 is a communication link between components of network 110. In certain embodiments, WAN connection 140 includes link 150 between edge router 120a and edge router 120b. Link 150 transmits through a public network such that other routers (e.g., intermediate routers 130) are unaware that the transmission is part of a private network. In certain embodiments, the interfaces associated with link 150 are configured with an IP address that is not used anywhere else in network 110. In some embodiments, link 150 is a tunnel. For example, link 150 may be an MPLS tunnel, a Generic Routing Encapsulation (GRE) tunnel, a Datagram Transport Layer Security (DTLS) tunnel, a Traffic Engineering (TE) tunnel, and the like.

Probe packets 160 (probe packets 160a, probe packets 160, and probe packets 160c0 of system 100 are network packets used to compute metrics (e.g., jitter, latency, loss, reachability, one-way delay (OWD), etc.) on channels within network 110. In certain embodiments, probe packets 160 are forwarded between components of network 110 in the same way as real traffic. Probe packets 160 may include BFD probe packets, Internet Control Message Protocol (ICMP) probe packets, periodic Hypertext Transfer Protocol (HTTP) request probe packets, IP SLA measurement probe packets, a combination thereof, etc.

In certain embodiments, probe packets 160 are communicated between edge router 120a and edge router 120b to measure the performance of link 150. In the illustrated embodiment of FIG. 1, probe packets 160 are represented by dashed lines. In some embodiments, loss, latency, and/or jitter metrics represent the status of link 150. In the illustrated embodiment of FIG. 1, probe packets 160 include probe packets 160a for voice traffic, probe packets 160b for video traffic, and probe packets 160c for bulk data traffic.

FEC engine 170 of system 100 is component within network 110 that performs adaptive FEC processing. In certain embodiments, FEC engine 170 recovers lost network packets 164 by sending extra "parity" packets for every group (N) of network packets 164. For example, referring to FIG. 1, for each predetermined number (e.g., 4) of network packets 164 (network packet 164a, network packet 164b, network packet 164c, and network packet 164d), one parity packet 164e may be inserted. In the event network packet 164a, for example, is lost, lost network packet 164a may be reconstructed using the metadata stored in parity packet 164e. As illustrated in FIG. 1, FEC packet reconstruction 166 is sent across link 150 between edge router 120a and edge router 120b.

In certain embodiments, FEC engine 170 is configured to dynamically invoke FEC. For example, FEC engine 170 may dynamically invoke FEC if the loss experienced by link 150 (e.g., packet loss) exceeds loss threshold 180. Loss threshold 180 may be configured by a user (e.g., a network administrator). In certain embodiments, loss threshold 180 is a value within a range of 1 percent to 10 percent (e.g., 2 percent, 4 percent, 6 percent, etc.).

FEC engine 170 may determine to initiate adaptive FEC processing based on the dynamic changes of the health of link 150. For example, PFR may monitor the health of link 150 by calculating loss values 182 (loss value 182a, loss value 182b, and loss value 182c) of probe packets 160 (probe packets 160a, probe packets 160b, and probe packets 160c). In certain embodiments, loss values 182 represent the packet loss, latency, and/or jitter experienced along link 150. For example, loss value 182 may represent the percentage of packets lost along link 150. In certain embodiments, loss value 182 may be calculated by taking a mean loss value over a predetermined amount of time (e.g., 5 minutes, 10 minutes, etc.), over a predetermined number of windows (e.g., 6 windows, etc.), a combination thereof, etc.

Using adaptive FEC activation, when loss value 182 of probe packets 160 traversing link 150 exceeds loss threshold 180, FEC engine 170 may start FEC packet reconstruction 166. In some embodiments, FEC engine 170 uses FEC data policies 172 to determine whether to invoke FEC. FEC data policies 172 may use one or more VPN lists to specify which VPN identifiers will be affected by FEC data policies 172, one or more application lists to match applications of interest, one or more application probe classes 174 to specify DSCP values 176 used for probing the WAN, SLA classes to specify the maximum packet loss, latency, and/or jitter, one or more match-action rules for FEC data policies 172, one or more site lists to specify which sites will receive FEC data policies 172, and the like.

In certain embodiments, application probe classes 174 (application probe class 174a, application probe class 174b, and application probe class 174c) define the marking per color of applications forwarded. Each application probe class 174 may be associated with one or more specific types of applications. The types of applications may include IP routing applications (e.g., IP routing protocols such as BGP, OSPF, etc.), voice applications (e.g., voice over Internet Protocol (VoIP) bearer traffic), interactive video applications (e.g., IP video conferencing), streaming video applications (e.g., unicast or multicast video), mission critical applications, call signaling applications (e.g., voice and/or video signaling traffic such as Skinny Client Control Protocol (SCCP), Session Initiation Protocol (SIP), etc.), transactional data applications (e.g., foreground, user-interactive applications such as database access, transaction services, interactive messaging, preferred data services, etc.), network management applications (e.g., network management protocols such as Simple Network Management Protocol (SNMP), Syslog, Domain Name Servers (DNS), etc.), bulk data applications (e.g., background and noninteractive traffic flows such as large file transfers, content distribution, database synchronization, backup operations, email, etc.), scavenger applications (e.g., a "less-than-best effort" service), best effort applications, and the like.

In certain embodiments, each application probe class 174 may include DSCP value 176 (DSCP value 176a, DSCP value 176b, or DSCP value 176c), a forwarding class, and/or a color. The color and/or DSCP mapping may be local to a specific network site (e.g., a company's SD-WAN network site). In certain embodiments, edge routers 120 treat traffic with different DSCP values 176 differently. DSCP is a means of classifying and managing network traffic. DSCP may provide quality of service (QoS) in certain networks (e.g., Layer 3 IP networks).

DSCP values 176 may depend on the application type. For example, IP routing applications may be associated with a DSCP value 176 of 48, voice applications may be associated with a DSCP value 176 of 46, interactive video applications may be associated with a DSCP value 176 of 34, streaming video applications may be associated with a DSCP value 176 of 32, mission critical applications may be associated with a DSCP value 176 of 26, call signaling applications may be associated with a DSCP value 176 of 24, transactional data applications may be associated with a DSCP value 176 of 18, network management applications may be associated with a DSCP value 176 of 16, bulk data applications may be associated with a DSCP value 176 of 10, scavenger applications may be associated with a DSCP value 176 of 8, best effort applications may be associated with a DSCP value 176 of 0, and so on. Traffic with different DSCP markings receives varied priority across WAN connection 140.

In certain embodiments, different application probe classes 174 (application probe class 174a, application probe class 174b, and application probe class 174c) of traffic along link 150 experience different percentages of loss. For example, probe packets 160a associated with voice traffic may experience loss value 182a of 1 percent, probe packets 160b for video traffic may experience loss value 182b of 3 percent, and probe packets 160c for bulk data traffic may experience loss value of 5 percent. In the illustrated embodiment of FIG. 1, each dropped probe packet 160 is represented with an "X".

In operation, FEC engine 170 of system 100 configures application probe class 174a associated with DSCP value 176a, application probe class 174b associated with DSCP value 176b, and application probe class 174c associated with DSCP value 176c. FEC engine 170 determines adaptive FEC data policy 172a for application probe class 174a, adaptive FEC data policy 172b for application probe class 174b, and adaptive FEC data policy 172b for application probe class 174b. FEC data policy 172a associates application probe class 174a with loss threshold 180a, FEC data policy 172b associates application probe class 174b with loss threshold 180b, and FEC data policy 172c associates application probe class 174c with loss threshold 180c. FEC engine 170 calculates mean loss value 182a, mean loss value 182b, and mean loss value 182c associated with application probe class 174a, application probe class 174b, and application probe class 174c, respectively, for link 150 between edge router 120a and edge router 120b. FEC engine 170 compares mean loss value 182a, mean loss value 182b, and mean loss value 182c to loss threshold 180a, loss threshold 180b, and loss threshold 180c, respectively, and determines whether to activate FEC processing for application probe class 174a, application probe class 174b, and application probe class 174c in response to these comparisons.

If FEC engine 170 determines that mean loss value 182a associated with application probe class 174a, mean loss value 182b associated with application probe class 174b, and/or mean loss value 182c associated with application probe class 174c is greater than or equal to loss threshold 180a, loss threshold 180b, and/or loss threshold 180c, respectively, FEC engine 170 activates the FEC processing for the respective application probe class(es) 174. If FEC engine 170 determines that mean loss value 182a associated with application probe class 174a, mean loss value 182b associated with application probe class 174b, and/or mean loss value 182c associated with application probe class 174c is less than loss threshold 180*a*, loss threshold 180*b*, and/or loss threshold 180*c*, respectively, FEC engine 170 skips the FEC processing for the respective application probe class(es) 174.

In the event FEC engine 170 activates the FEC processing for application probe class 174*a*, application probe class 174*b*, and/or application probe class 174*c*, FEC engine 170 calculates next mean loss value 182*a* associated with application probe class 174*a*, next mean loss value 182*b* associated with application probe class 174*b*, and/or next mean loss value 182*c* associated with application probe class 174*c* for link 150 between edge router 120*a* and edge router 120*b*. FEC engine 170 compares next mean loss value 182*a*, next mean loss value 182*b*, and/or next mean loss value 182*c* to loss threshold 180*a*, loss threshold 180*b*, and/or loss threshold 180*c*, respectively, and determines whether to activate FEC processing for application probe class 174*a*, application probe class 174*b*, and/or application probe class 174*c* in response to these comparisons.

If FEC engine 170 determines that next mean loss value 182*a*, next mean loss value 182*b*, and/or next mean loss value 182*c* is less than loss threshold 180*a*, loss threshold 180*b*, and/or loss threshold 180*c*, respectively, FEC engine 170 deactivates the FEC processing for respective application probe class(es) 174. If FEC engine 170 determines that next mean loss value 182*a*, next mean loss value 182*b*, and/or next mean loss value 182*c* is greater than or equal to loss threshold 180*a*, loss threshold 180*b*, and/or loss threshold 180*c*, respectively, FEC engine 170 continues the FEC processing for respective application probe class(es) 174. As such, FEC engine 170 system 100 activates adaptive FEC accurately by calculating actual loss per DSCP class instead of treating the entire traffic in aggregation, which minimizes bandwidth consumption while still achieving exact guaranteed delivery.

Although FIG. 1 illustrates a particular number of networks 110, edge routers 120, intermediate routers 130, WAN connections 140, links 150, probe packets 160, network packets 164, FEC packet reconstructions 166, FEC engines 170, FEC data policies 172, application probe classes 174, DSCP values 176, loss thresholds 180, and loss values 182, this disclosure contemplates any suitable number of networks 110, edge routers 120, intermediate routers 130, WAN connections 140, links 150, probe packets 160, network packets 164, FEC packet reconstructions 166, FEC engines 170, FEC data policies 172, application probe classes 174, DSCP values 176, loss thresholds 180, and loss values 182.

Although FIG. 1 illustrates a particular arrangement of network 110, edge routers 120, intermediate routers 130, WAN connection 140, link 150, probe packets 160, network packets 164, FEC packet reconstruction 166, FEC engine 170, FEC data policies 172, application probe classes 174, DSCP values 176, loss thresholds 180, and loss values 182, this disclosure contemplates any suitable arrangement of network 110, edge routers 120, intermediate routers 130, WAN connection 140, link 150, probe packets 160, network packets 164, FEC packet reconstruction 166, FEC engine 170, FEC data policies 172, application probe classes 174, DSCP values 176, loss thresholds 180, and loss values 182.

Furthermore, although FIG. 1 describes and illustrates particular components, devices, or systems carrying out particular actions, this disclosure contemplates any suitable combination of any suitable components, devices, or systems carrying out any suitable actions. For example, a network controller may perform one or more actions of system 100.

Figure 2:
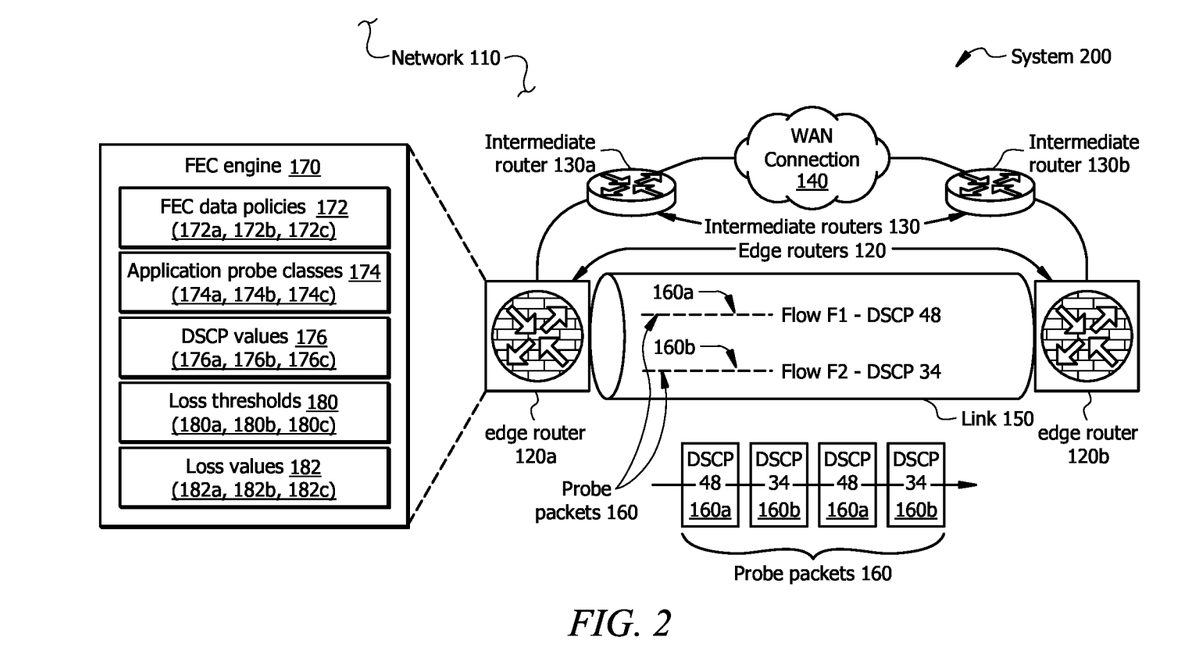
FIG. 2 illustrates a system for activating adaptive forward error correction (FEC), in accordance with certain embodiments.

FIG. 2 illustrates an example system 200 for activating adaptive FEC. System 200 or portions thereof may be associated with an entity, which may include any entity, such as a business, company, or enterprise, that activates adaptive FEC. In certain embodiments, the entity may be a service provider that provides services for activating adaptive FEC. The components of system 200 may include any suitable combination of hardware, firmware, and software. For example, the components of system 200 may use one or more elements of the computer system of FIG. 5.

In the illustrated embodiment of FIG. 2, system 200 includes system 100 includes network 110, edge routers 120 (edge router 120*a* and edge router 120*b*), intermediate routers 130 (intermediate router 130*a* and intermediate router 130*b*), a WAN connection 140, a link 150, probe packets 160 (probe packets 160*a*, probe packets 160*b*, and probe packets 160*c*), network packets 164 (network packet 164*a*, network packet 164*b*, network packet 164*c*, network packet 164*d*, and parity packet 164*e*), an FEC packet reconstruction 166, an FEC engine 170, FEC data policies 172 (FEC data policies 172*a*, FEC data policy, 172*b*, and FEC data policy 172*c*), application probe classes 174 (application probe class 174*a*, application probe class 174*b*, and application probe class 174*c*), DSCP values 176 (DSCP value 176*a*, DSCP value 176*b*, and DSCP value 176*c*), loss thresholds 180 (loss threshold 180*a*, loss threshold 180*b*, and loss threshold 180*c*), and loss values 182 (loss value 182*a*, loss value 182*b*, and loss value 182*c*), which are described above in FIG. 1.

System 200 incorporates underlay monitoring metrics to improve characteristics of link 150 with a microscopic view. These metrics are useful even if DSCP values 176 are not honored at intermediate routers 130. The behavioral pattern of a flow varies with respect to the characteristics of the packet like length, IP header fields, etc. In certain embodiments, underlay monitoring probe packets 160 match to the real-time flow characteristics, and these metrics are incorporated into adaptive FEC to boost the network integrity.

In the illustrated embodiment of FIG. 2, link 150 from edge router 120*a* to edge router 120*b* has two different classes of flows on link 150. Flow F1 is associated with DSCP value 176*a* of 48 (e.g., voice traffic), and flow F2 is associated with DSCP value 176*b* of 34 (e.g., video traffic). FEC data policy 172*a* is configured such that application probe class 174*a* is associated with color MPLS marked with DSCP value 176*a* of 48, and FEC data policy 172*b* is configured such that application probe class 174*b* is associated with color MPLS marked with DSCP value 176*b* of 34. Probe packets 160*a* with DSCP value 176*a* of 48 are communicated (see Flow F1) along link 150 from edge router 120*a* to edge router 120*b*, and probe packets 160*b* with DSCP value 176*b* of 34 are communicated (see Flow F2) along link 150 from edge router 120*a* to edge router 120*b*. In certain embodiments, probe packets 160*a* and probe packets 160*b* may be communicated along link 150 in a round-robin fashion. Since traffic with different DSCP values 176 receive varied priority across WAN connection 140, probe packets 160*a* having DSCP value 176*a* of 48 may experience different losses across link 150 than probe packets 160*b* having DSCP value 176*b* of 34.

In certain embodiments, FEC engine 170 activates FEC processing when loss value 182 for application probe class 174 exceeds loss threshold 180*a*. For example, FEC engine 170 may skip FEC processing for flow F1 if loss value 182*a* (e.g., 3 percent) associated with application probe class 174*a* for flow F1 is less than loss threshold 180*a* (e.g., 4 percent). As another example, FEC engine 170 may activate FEC processing for flow F2 if loss value 182*b* (e.g., 6 percent) associated with application probe class 174*b* for flow F2 is greater than or equal to loss threshold 180*b* (e.g., 4 percent). As such, FEC packet reconstruction 166 may be activated for a particular flow (e.g., flow F1 or flow F2) based on each flow's independent loss value 182 rather than activating FEC for both flows based on the total loss on link 150 (e.g., 5 percent), which minimizes bandwidth consumption while still achieving exact guaranteed delivery.

Although FIG. 2 illustrates a particular number of networks 110, edge routers 120, intermediate routers 130, WAN connections 140, links 150, probe packets 160, network packets 164, FEC packet reconstructions 166, FEC engines 170, FEC data policies 172, application probe classes 174, DSCP values 176, loss thresholds 180, and loss values 182, this disclosure contemplates any suitable number of networks 110, edge routers 120, intermediate routers 130, WAN connections 140, links 150, probe packets 160, network packets 164, FEC packet reconstructions 166, FEC engines 170, FEC data policies 172, application probe classes 174, DSCP values 176, loss thresholds 180, and loss values 182.

Although FIG. 2 illustrates a particular arrangement of network 110, edge routers 120, intermediate routers 130, WAN connection 140, link 150, probe packets 160, network packets 164, FEC packet reconstruction 166, FEC engine 170, FEC data policies 172, application probe classes 174, DSCP values 176, loss thresholds 180, and loss values 182, this disclosure contemplates any suitable arrangement of network 110, edge routers 120, intermediate routers 130, WAN connection 140, link 150, probe packets 160, network packets 164, FEC packet reconstruction 166, FEC engine 170, FEC data policies 172, application probe classes 174, DSCP values 176, loss thresholds 180, and loss values 182.

Furthermore, although FIG. 2 describes and illustrates particular components, devices, or systems carrying out particular actions, this disclosure contemplates any suitable combination of any suitable components, devices, or systems carrying out any suitable actions. For example, a network controller may perform one or more actions of system 200.

Figure 3:
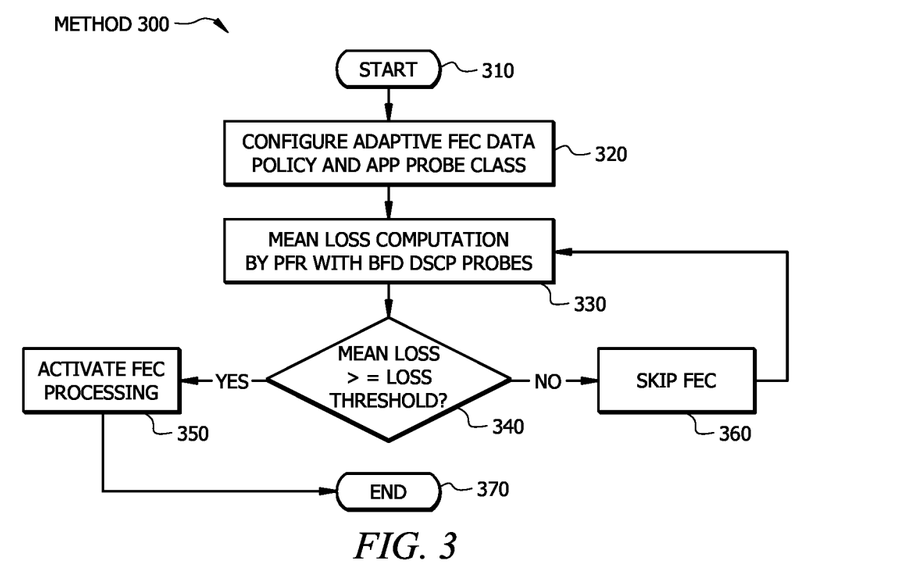
FIG. 3 illustrates a method for activating adaptive FEC processing, in accordance with certain embodiments.

FIG. 3 illustrates an example method 300 for activating adaptive FEC processing. In the illustrated embodiment of FIG. 3, adaptive FEC is configured with an FEC data policy along with a loss threshold value. The decision of adaptive FEC processing is tied to the dynamic changes of the link health. Performance routing monitors the link health by calculating loss, latency, and/or jitter parameters. Using adaptive FEC activation, when the downloaded mean loss value for that class exceeds the threshold, FEC parity packet reconstruction is started.

Method 300 begins at step 310. At step 320 of method 300, an FEC engine configures an adaptive FEC data policy and an application probe class. For example, referring to FIG. 1, FEC engine 170 of system 100 may configure adaptive FEC data policy 172*a* and application probe class 174*a*. The application probe class is associated with a DSCP value (e.g., a DSCP value of 34) and a loss threshold (e.g., 5 percent). Method 300 then moves from step 320 to step 330.

At step 330 of method 300, the FEC engine uses PFR to calculate a loss value for a network link between two edge nodes using DSCP probe packets. For example, referring to FIG. 1, FEC engine 170 may calculate loss value 182*a* associated with application probe class 174*a* for link 150 between edge router 120*a* and edge router 120*b* using DSCP probe packets 160*a*. FEC engine 170 then compares the loss value to the loss threshold. Method 300 then moves from step 330 to step 340.

At step 340 of method 300, the FEC engine determines whether the loss value for the DSCP probe packets is greater than or equal to the loss threshold. For example, referring to FIG. 1, FEC engine 170 may determine whether loss value 182*a* (e.g., 3 percent or 6 percent) associated with application probe class 174*a* is greater than or equal to loss threshold 180*a* (e.g., 5 percent). If the FEC engine determines that the loss value associated with the application probe class is greater than or equal to the loss threshold, then method 300 moves from step 340 to step 350, where the FEC engine activates the FEC processing for the application probe class. Method 300 then advances from step 350 to step 370, where method 300 ends. If, at step 340, the FEC engine determines that the loss value associated with the application probe class is less than the loss threshold, method 300 advances from step 340 to step 360, where the FEC engine skips the FEC processing. Method 300 then repeats steps 330 through 360 until the FEC processing is activated. As such, method 300 activates adaptive FEC accurately by calculating actual loss per DSCP application probe class instead of treating the entire traffic in aggregation, which minimizes bandwidth consumption while still achieving exact guaranteed delivery.

Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates an example method 300 for activating FEC processing including the particular steps of the method of FIG. 3, this disclosure contemplates any suitable method for activating FEC processing, which may include all, some, or none of the steps of the method of FIG. 3, where appropriate. Although FIG. 3 describes and illustrates particular components, devices, or systems carrying out particular actions, this disclosure contemplates any suitable combination of any suitable components, devices, or systems carrying out any suitable actions.

Figure 4:
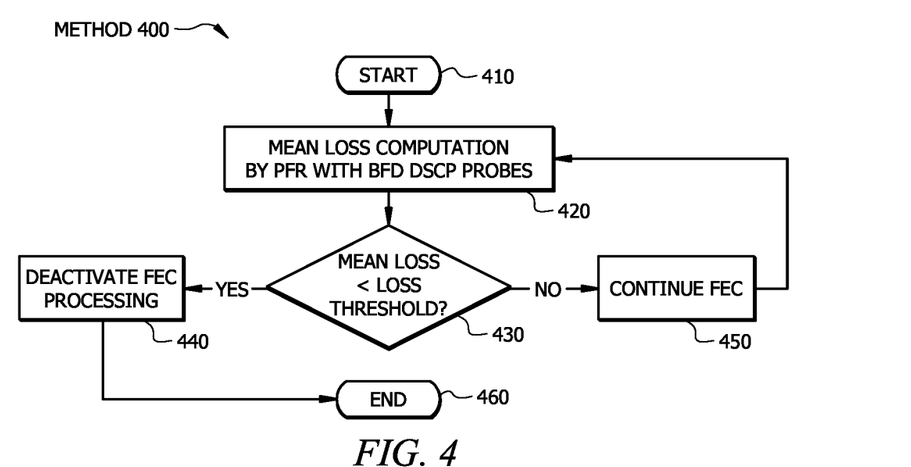
FIG. 4 illustrates a method for deactivating adaptive FEC processing, in accordance with certain embodiments.

FIG. 4 illustrates an example method 400 for deactivating adaptive FEC processing. When a link is recovering from loss, it may be necessary to ensure that the loss on the link is under control before deactivating FEC on link. Using the PFR mean loss value for the application probe class may guarantee that the link has been stable for the last few windows, and therefore that it is safe to disable FEC. In certain embodiments, method 400 of FIG. 4 is an extension of method 300 of FIG. 3.

Method 400 begins at step 410. At step 420 of method 400, an FEC engine uses performance routing to calculate a mean loss value for a network link between two edge nodes using DSCP probe packets after FEC has been activated on the link. For example, referring to FIG. 1, FEC engine 170 may calculate next loss value 182*a* associated with application probe class 174*a* for link 150 between edge router 120*a* and edge router 120*b* using DSCP probe packets 160*a* after FEC has been activated on link 150. FEC engine 170 then compares the loss value to the loss threshold. Method 400 then moves from step 420 to step 430.

At step 430 of method 400, the FEC engine determines whether the next mean loss value is less than the loss threshold. For example, referring to FIG. 1, FEC engine 170 may determine whether next mean loss value 182*a* associated with application probe class 174*a* is less than loss threshold 180*a*. If the FEC engine determines that the loss value associated with the application probe class is less than the loss threshold, then method 400 moves from step 430 to step 440, where the FEC engine deactivates the FEC processing for the application probe class. Method 400 then moves from step 440 to step 460, where method 400 ends.

If, at step 430, the FEC engine determines that the loss value associated with the application probe class is greater than or equal to the loss threshold, method 400 advances from step 430 to step 450, where the FEC engine continues the FEC processing. Method 400 then repeats steps 420 through 450 until the FEC processing is deactivated. As such, method 400 deactivates adaptive FEC for each application probe class once the loss on the link is under control.

Although this disclosure describes and illustrates particular steps of method 400 of FIG. 4 as occurring in a particular order, this disclosure contemplates any suitable steps of method 400 of FIG. 4 occurring in any suitable order. Although this disclosure describes and illustrates an example method 400 for deactivating FEC processing including the particular steps of the method of FIG. 4, this disclosure contemplates any suitable method for deactivating FEC processing, which may include all, some, or none of the steps of the method of FIG. 4, where appropriate. Although FIG. 4 describes and illustrates particular components, devices, or systems carrying out particular actions, this disclosure contemplates any suitable combination of any suitable components, devices, or systems carrying out any suitable actions.

Figure 5:
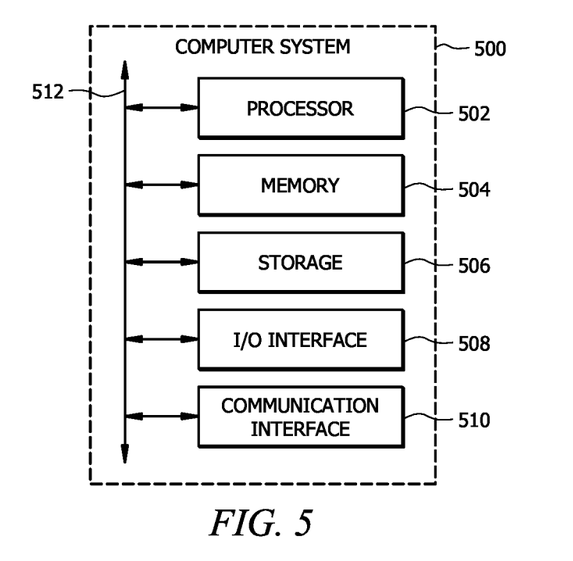
FIG. 5 illustrates a computer system, in accordance with certain embodiments.

FIG. 5 illustrates an example computer system 500. In particular embodiments, one or more computer system 500 perform one or more steps of one or more methods described or illustrated herein. In particular embodiments, one or more computer system 500 provide functionality described or illustrated herein. In particular embodiments, software running on one or more computer system 500 performs one or more steps of one or more methods described or illustrated herein or provides functionality described or illustrated herein. Particular embodiments include one or more portions of one or more computer system 500. Herein, reference to a computer system may encompass a computing device, and vice versa, where appropriate. Moreover, reference to a computer system may encompass one or more computer systems, where appropriate.

This disclosure contemplates any suitable number of computer system 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer system 500; be unitary or distributed; span multiple locations; span multiple machines; span multiple data centers; or reside in a cloud, which may include one or more cloud components in one or more networks. Where appropriate, one or more computer system 500 may perform without substantial spatial or temporal limitation one or more steps of one or more methods described or illustrated herein. As an example, and not by way of limitation, one or more computer system 500 may perform in real time or in batch mode one or more steps of one or more methods described or illustrated herein. One or more computer system 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 202. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer system 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association Local Bus (VLB), or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. A first network node comprising one or more processors and one or more computer-readable non-transitory storage media coupled to the one or more processors and including instructions that, when executed by the one or more processors, cause the first network node to perform operations comprising:
    configuring a first application probe class and a second application probe class, wherein the first application probe class is associated with a first Differentiated Services Code Point (DSCP) and the second application probe class is associated with a second DSCP;
    determining an adaptive Forward Error Correction (FEC) data policy for the first application probe class and the second application probe class;
    calculating a first loss value associated with the first application probe class for a link between the first network node and a second network node;
    comparing the first loss value to a first loss threshold; and
    determining whether to activate FEC processing for the first application probe class in response to comparing the first loss value to the first loss threshold.

2. The first network node of claim 1, wherein the adaptive FEC policy associates the first application probe class with the first loss threshold and the second application probe class with a second loss threshold.

3. The first network node of claim 1, the operations further comprising:
    determining that the first loss value associated with the first application probe class is greater than or equal to the first loss threshold; and
    activating the FEC processing for the first application probe class in response to determining that the first loss value associated with the first application probe class is greater than or equal to the first loss threshold.

4. The first network node of claim 1, the operations further comprising:
    determining that the first loss value associated with the first application probe class is less than the first loss threshold; and
    skipping the FEC processing in response to determining that the first loss value associated with the first application probe class is less than the first loss threshold.

5. The first network node of claim 1, the operations further comprising:
    calculating a second loss value associated with the first application probe class for the link between the first network node and the second network node while the FEC processing is activated;
    comparing the second loss value to the first loss threshold;
    determining that the second loss value is less than the first loss threshold; and
    deactivating the FEC processing in response to determining that the second loss value is less than the first loss threshold.

6. The first network node of claim 1, the operations further comprising:
    calculating a second loss value associated with the first application probe class for the link between the first network node and the second network node while the FEC processing is activated;
    comparing the second loss value to the first loss threshold;
    determining that the second loss value is greater than or equal to the first loss threshold; and
    continuing the FEC processing in response to determining that the second loss value is greater than or equal to the first loss threshold.

7. The first network node of claim 1, wherein:
    the first application probe class is further associated with a first forwarding class and a first color; and
    the second application probe class is further associated with a second forwarding class and a second color.

8. A method, comprising:
    configuring a first application probe class and a second application probe class, wherein the first application probe class is associated with a first Differentiated Services Code Point (DSCP) and the second application probe class is associated with a second DSCP;
    determining an adaptive Forward Error Correction (FEC) data policy for the first application probe class and the second application probe class;
    calculating a first loss value associated with the first application probe class for a link between a first network node and a second network node;
    comparing the first loss value to a first loss threshold; and
    determining whether to activate FEC processing for the first application probe class in response to comparing the first loss value to the first loss threshold.

9. The method of claim 8, wherein the adaptive FEC policy associates the first application probe class with the first loss threshold and the second application probe class with a second loss threshold.

10. The method of claim 8, further comprising:
    determining that the first loss value associated with the first application probe class is greater than or equal to the first loss threshold; and
    activating the FEC processing for the first application probe class in response to determining that the first loss value associated with the first application probe class is greater than or equal to the first loss threshold.

11. The method of claim 8, further comprising:
   determining that the first loss value associated with the first application probe class is less than the first loss threshold; and
   skipping the FEC processing in response to determining that the first loss value associated with the first application probe class is less than the first loss threshold.

12. The method of claim 8, further comprising:
   calculating a second loss value associated with the first application probe class for the link between the first network node and the second network node while the FEC processing is activated;
   comparing the second loss value to the first loss threshold;
   determining that the second loss value is less than the first loss threshold; and
   deactivating the FEC processing in response to determining that the second loss value is less than the first loss threshold.

13. The method of claim 8, further comprising:
   calculating a second loss value associated with the first application probe class for the link between the first network node and the second network node while the FEC processing is activated;
   comparing the second loss value to the first loss threshold;
   determining that the second loss value is greater than or equal to the first loss threshold; and
   continuing the FEC processing in response to determining that the second loss value is greater than or equal to the first loss threshold.

14. The method of claim 8, wherein:
   the first application probe class is further associated with a first forwarding class and a first color; and
   the second application probe class is further associated with a second forwarding class and a second color.

15. One or more computer-readable non-transitory storage media embodying instructions that, when executed by a processor, cause the processor to perform operations comprising:
   configuring a first application probe class and a second application probe class, wherein the first application probe class is associated with a first Differentiated Services Code Point (DSCP) and the second application probe class is associated with a second DSCP;
   determining an adaptive Forward Error Correction (FEC) data policy for the first application probe class and the second application probe class;
   calculating a first loss value associated with the first application probe class for a link between a first network node and a second network node;
   comparing the first loss value to a first loss threshold; and
   determining whether to activate FEC processing for the first application probe class in response to comparing the first loss value to the first loss threshold.

16. The one or more computer-readable non-transitory storage media of claim 15, wherein the adaptive FEC policy associates the first application probe class with the first loss threshold and the second application probe class with a second loss threshold.

17. The one or more computer-readable non-transitory storage media of claim 15, the operations further comprising:
   determining that the first loss value associated with the first application probe class is greater than or equal to the first loss threshold; and
   activating the FEC processing for the first application probe class in response to determining that the first loss value associated with the first application probe class is greater than or equal to the first loss threshold.

18. The one or more computer-readable non-transitory storage media of claim 15, the operations further comprising:
   determining that the first loss value associated with the first application probe class is less than the first loss threshold; and
   skipping the FEC processing in response to determining that the first loss value associated with the first application probe class is less than the first loss threshold.

19. The one or more computer-readable non-transitory storage media of claim 15, the operations further comprising:
   calculating a second loss value associated with the first application probe class for the link between the first network node and the second network node while the FEC processing is activated;
   comparing the second loss value to the first loss threshold;
   determining that the second loss value is less than the first loss threshold; and
   deactivating the FEC processing in response to determining that the second loss value is less than the first loss threshold.

20. The one or more computer-readable non-transitory storage media of claim 15, the operations further comprising:
   calculating a second loss value associated with the first application probe class for the link between the first network node and the second network node while the FEC processing is activated;
   comparing the second loss value to the first loss threshold;
   determining that the second loss value is greater than or equal to the first loss threshold; and
   continuing the FEC processing in response to determining that the second loss value is greater than or equal to the first loss threshold.

* * * * *